(12) United States Patent
Izawa et al.

(10) Patent No.: US 7,510,060 B2
(45) Date of Patent: Mar. 31, 2009

(54) DAMPER WITH VARIABLE DAMPING FORCE

(75) Inventors: Masaki Izawa, Saitama (JP); Yoshio Onoe, Saitama (JP); Tsukasa Fukuzato, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/212,915

(22) Filed: Aug. 29, 2005

(65) Prior Publication Data

US 2006/0118370 A1    Jun. 8, 2006

(30) Foreign Application Priority Data

Sep. 7, 2004    (JP) ............................. 2004-259184

(51) Int. Cl.
  *F16F 15/03*    (2006.01)
(52) U.S. Cl. .................................... 188/267; 188/266.8
(58) Field of Classification Search ................. 188/267, 188/267.1, 267.2
  See application file for complete search history.

(56) References Cited

U.S. PATENT DOCUMENTS

| | | | | |
|---|---|---|---|---|
| 5,439,082 A | * | 8/1995 | McKeown et al. | 188/379 |
| 5,632,361 A | * | 5/1997 | Wulff et al. | 188/267 |
| 5,937,975 A | * | 8/1999 | Forster | 188/266.6 |
| 6,095,486 A | * | 8/2000 | Ivers et al. | 251/129.01 |
| 6,129,185 A | * | 10/2000 | Osterberg et al. | 188/267.2 |
| 6,152,488 A | * | 11/2000 | Hedderly et al. | 280/775 |
| 6,974,000 B2 | * | 12/2005 | Carlson et al. | 188/267.2 |
| 6,981,577 B2 | * | 1/2006 | Katayama et al. | 188/267.2 |
| 2003/0155195 A1 | * | 8/2003 | Carlson et al. | 188/267 |

FOREIGN PATENT DOCUMENTS

| | | |
|---|---|---|
| JP | 60-113711 | 6/1985 |
| JP | 63-158561 U | 10/1988 |
| JP | 4-104089 A | 4/1992 |
| JP | 11-108106 A | 4/1999 |
| JP | 2001-003770 A | 1/2001 |
| JP | 2001-026256 A | 1/2001 |
| JP | 2003-276601 A | 10/2003 |

* cited by examiner

*Primary Examiner*—Robert A Siconolfi
*Assistant Examiner*—James K Hsiao
(74) *Attorney, Agent, or Firm*—Arent Fox LLP

(57) ABSTRACT

A damper with a controllable variable damping force, includes a piston and a cylinder provided with a magnetic viscous fluid and piston therein. An interior of the cylinder is divided by the piston into first and second fluid chambers which communicate with each other. A controller energizes a coil provided to the piston, wherein a viscosity of the magnetic viscous fluid in the fluid passage is changed when the coil is energized. When the controller fails to energize the coil, an electric current supply circuit supplies a predetermined constant electric current to the coil. Alternatively, when the controller detects an abnormality in energizing control of the coil, the controller supplies the predetermined constant electric current to the coil. Further, a sub-coil may be provided with the piston, wherein the controller supplies the sub-coil with a predetermined constant electric current whenever the coil is not operating properly.

16 Claims, 4 Drawing Sheets

DAMPER WITH VARIABLE DAMPING FORCE

The present invention is based upon Japanese priority application No. 2004-259184, which is hereby incorporated in its entirety herein by reference.

BACKGROUND OF THE INVENTION

1. Field of the Invention

The present invention relates to a damper with a variable damping force that is controlled by using a piston to divide an interior of a cylinder filled with a magnetic viscous fluid into a first fluid chamber and a second fluid chamber. The first fluid chamber and the second fluid chamber communicate with each other through a fluid passage formed to penetrate the piston. A coil provided with the piston is energized using a controller to change the viscosity of the magnetic viscous fluid in the fluid passage.

2. Description of the Related Art

Japanese Patent Application Laid-open No. 60-113711 discloses a damper in which the viscosity of a magnetic viscous fluid (MRF: Magneto-Rheological Fluids) is changed by a magnetic field and used as the viscous fluid by the damper of a suspension system having a variable damping force. A coil causes the magnetic field to act on the magnetic viscous fluid in the fluid passage and is provided with a piston that is slidably fitted in a cylinder. The damping force of the damper is controlled, as desired, by changing the viscosity of the magnetic viscous fluid in the fluid passage using the magnetic field generated by energizing the coil.

While the damper is able to secure a large variable area of the damping force, when it is impossible to energize a coil due to failure, the damping force is maintained at an extremely low level which increases the possibility of the riding comfort and driving stability of the vehicle to significantly deteriorate.

SUMMARY OF THE INVENTION

The present invention has been achieved in view of the above-mentioned circumstances and has an aspect to generate a predetermined damping force which provides minimal, but acceptable, riding comfort and driving stability when a damper having a variable damping force fails.

In order to achieve the above-mentioned aspect, according to a first feature of the invention, there is provided a damper with a variable damping force which is controlled by using a piston to divide an interior of a cylinder filled with a magnetic viscous fluid into a first fluid chamber and a second fluid chamber. The first fluid chamber and the second fluid chamber are permitted to communicate with each other through a fluid passage that is formed to penetrate the piston. A coil provided with the piston is energized by a controller to change the viscosity of the magnetic viscous fluid in the fluid passage. The damper includes an electric current supply circuit which supplies a predetermined constant current to the coil when energization control for the coil is not possible due to the failure of the controller.

With the arrangement of the first feature, even when energization control of the coil is not possible due to controller failure, the electric current supply circuit, instead of the controller, supplies a predetermined constant electric current to the coil. Therefore, the damper with the variable damping force is able to generate a predetermined damping force, thereby securing the minimum acceptable level of riding comfort and driving stability.

Also, according to a second feature of the invention, there is provided a damper with a variable damping force which is controlled by using a piston to divide an interior of a cylinder filled with a magnetic viscous fluid into a first fluid chamber and a second fluid chamber. The first fluid chamber and the second fluid chamber are permitted to communicate with each other through a fluid passage that is formed to penetrate the piston. A coil provided with the piston is energized by a controller to change the viscosity of the magnetic viscous fluid in the fluid passage. The controller supplies a predetermined constant electric current to the coil when the control unit detects an abnormality in an energizing control of the coil.

With the arrangement of the second feature, when the controller detects the abnormality in the energization control of the coil, the controller supplies a predetermined constant electric current to the coil. Therefore, the damper with a variable damping force is able to generate a predetermined damping force, thereby securing the minimum acceptable level of riding comfort and driving stability.

Further, according to a third feature of the invention, there is provided a damper with a variable damping force which is controlled by using a piston to divide an interior of a cylinder filled with a magnetic viscous fluid into a first fluid chamber and a second fluid chamber. The first fluid chamber and the second fluid chamber are permitted to communicate with each other through a fluid passage that is formed to penetrate the piston. A coil provided with the piston is energized by a controller to change the viscosity of the magnetic viscous fluid in the fluid passage. The piston includes a sub-coil disposed in parallel with respect to the coil, wherein the controller supplies a predetermined constant electric current to the sub-coil when the coil breaks.

With the arrangement of the third feature, when the coil breaks and control of the damping force is not possible, the controller supplies a predetermined constant electric current to the sub-coil disposed in parallel with the coil. Therefore, the damper with the variable damping force is able to generate a predetermined damping force using the magnetic field generated by the sub-coil, thereby securing the minimum acceptable level of riding comfort and driving stability.

The electronic control unit discussed herein corresponds to the controller of the present invention.

The above-mentioned aspect, other aspects, characteristics, and advantages of the present invention will become apparent from preferred embodiments which will be described in detail below by reference to the attached drawings.

DESCRIPTION OF THE PREFERRED EMBODIMENT

Figure 1:
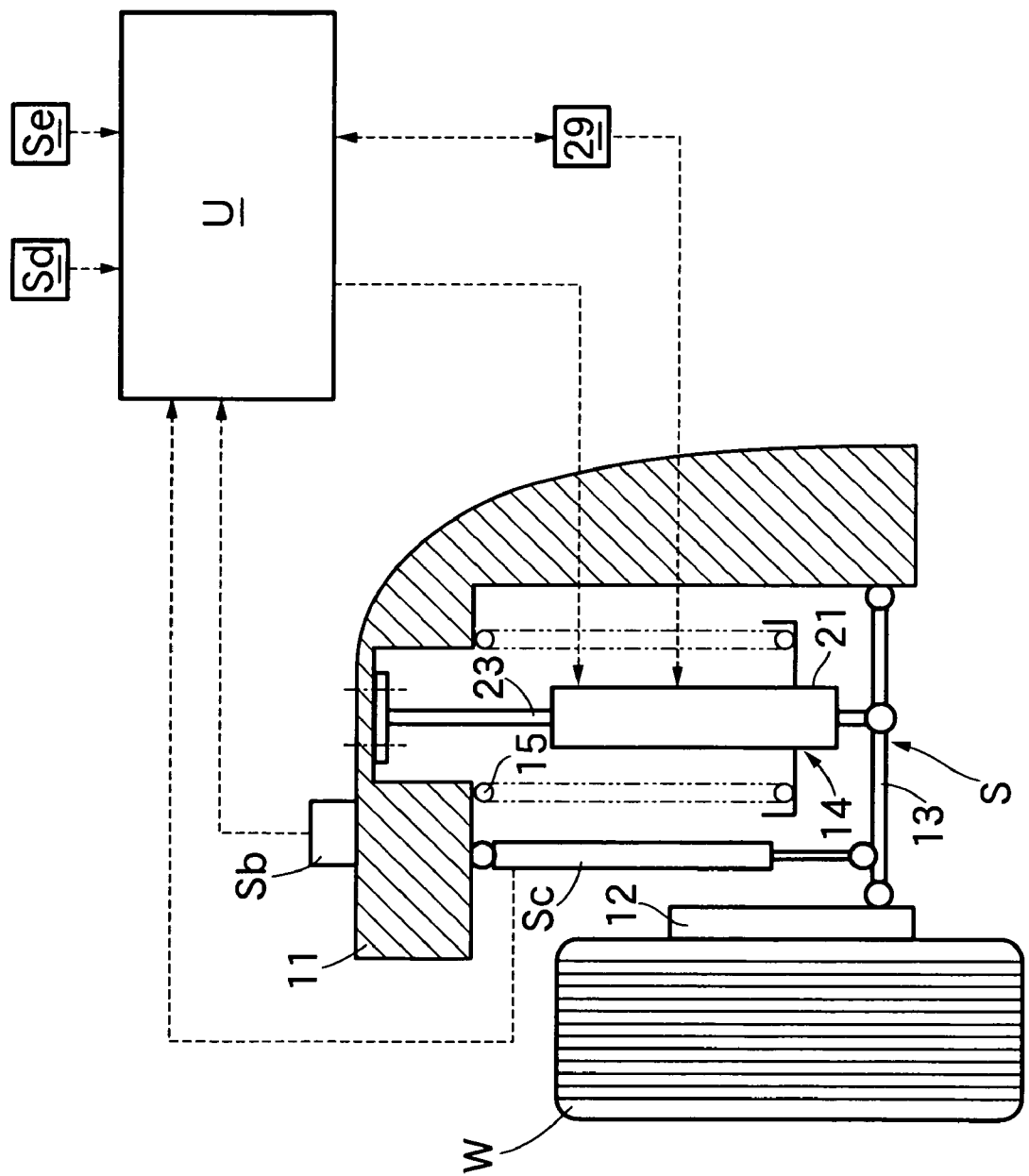
FIG. 1 is a front view of a suspension system of a vehicle, including a damper with a variable damping force according to a first embodiment of the present invention.
Figure 2:
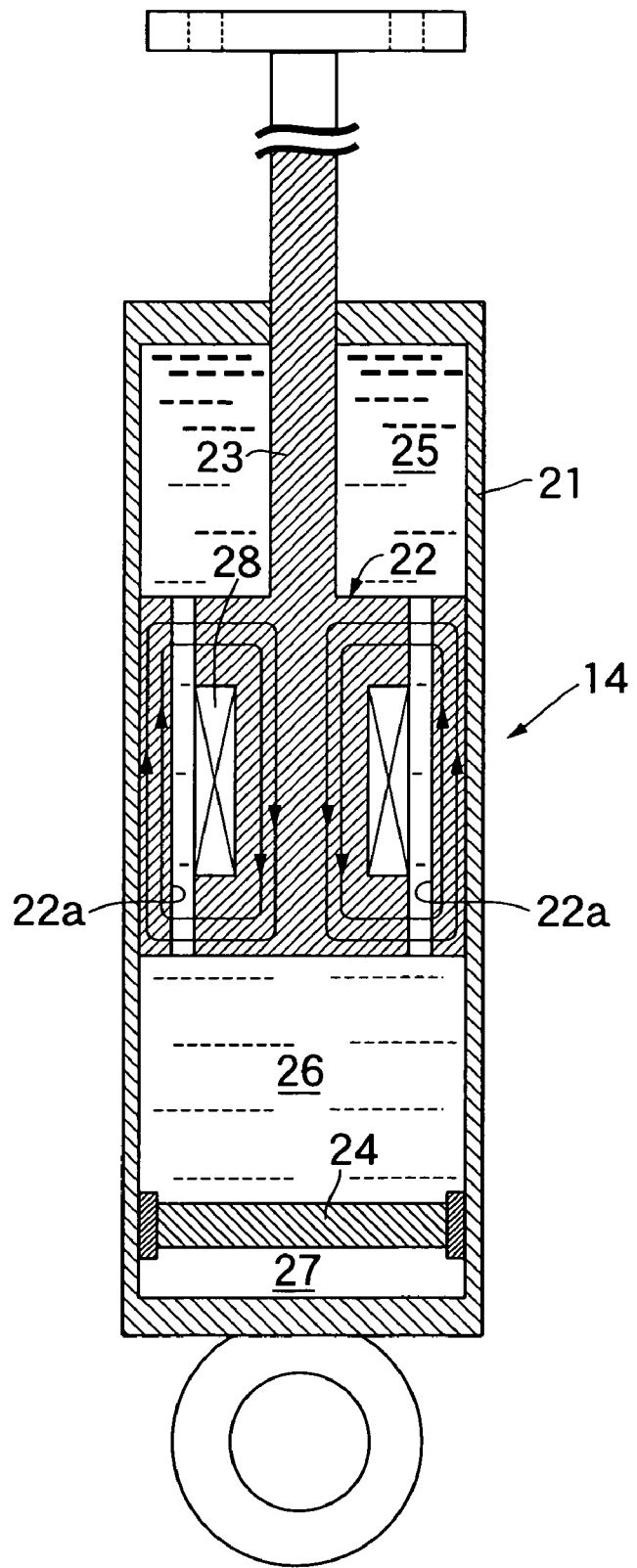
FIG. 2 is an enlarged sectional view of the damper.

FIGS. 1 and 2 show a first embodiment of the present invention.

As shown in FIG. 1, a suspension system S, which suspends a wheel W of a four-wheeled vehicle, includes a suspension arm 13 which supports a knuckle 12 at a vehicle body 11 to be movable up and down, a damper 14 with a variable damping force which connects the suspension arm 13 and the vehicle body 11, and a coil spring 15 which connects the suspension arm 13 and the vehicle body 11. A signal from an above-spring acceleration sensor Sb which detects an above-spring acceleration, a signal from a damper displacement sensor Sc which detects displacement (i.e., stroke) of the damper 14, a signal from a lateral acceleration sensor Sd which detects a lateral acceleration of the vehicle, and a signal from a longitudinal acceleration sensor Se which detects a longitudinal acceleration of the vehicle are each input into an electronic control unit U which controls the damping force of the damper 14.

As shown in FIG. 2, the damper 14 includes a cylinder 21 having a lower end connected to the suspension arm 13, a piston 22 slidably fitted within the cylinder 21, a piston rod 23 which extends upward from the piston 22 to fluid-tightly penetrate an upper wall of the cylinder 21 and which has an upper end connected to the vehicle body, and a free piston 24 which is slidably fitted in a lower part of the cylinder.

An interior of the cylinder 21 is partitioned by the piston 22 into a first fluid chamber 25 at an upper end and a second fluid chamber 26 at a lower end. A gas chamber 27 having a compression gas sealed therein is defined in a lower part of the free piston 24.

A plurality of fluid passages 22a are formed in the piston 22 to provide communication between upper and lower surfaces of the piston 22. The first and the second fluid chambers 25 and 26 communicate with each other through the fluid passages 22a as well. A magnetic viscous fluid is formed by dispersing magnetic particles, such as, iron powder, into a viscous fluid, such as, oil, and sealing the first and the second fluid chambers 25 and 26 as well as the fluid passages 22a. The magnetic viscous fluid has a property of increasing viscosity because, when given a magnetic field, the magnetic particles are aligned along a magnetic line of force to make it difficult for the viscous fluid to flow. A coil 28 is provided inside the piston 22, and energization of the coil 28 is controlled by the electronic control unit U. When the coil 28 is energized, a magnetic flux is generated, as shown by the arrow in FIG. 2, wherein the magnetic flux passing through the fluid passages 22a changes the viscosity of the magnetic viscous fluid.

In addition to being energized by the electronic control unit U, the coil 28 of the damper 14 is also energized by a current supply circuit 29 (see FIG. 1) provided separately from the electronic control unit U. The current supply circuit 29, in place of the electronic control unit U, supplies a predetermined constant electric current to the coil 28 whenever the electronic control unit U fails to function properly.

When the damper 14 contracts and the piston 22 moves downward relative to the cylinder 21, the capacity of the first fluid chamber 25 increases while the capacity of the second fluid chamber 26 decreases. Therefore, the magnetic viscous fluid of the second fluid chamber 26 passes through the fluid passages 22a of the piston 22 and enters the first fluid chamber 25. On the other hand, when the damper 14 extends and the piston 22 moves upward relative to the cylinder 21, the capacity of the second fluid chamber 26 increases while the capacity of the first fluid chamber 25 decreases. Therefore, the magnetic viscous fluid of the first fluid chamber 25 passes through the fluid passages 22a of the piston 22 and enters the second fluid chamber 26. During this process, the damper 14 generates a damping force due to the viscosity resistance of the magnetic viscous fluid passing through the fluid passages 22a.

At this time, if the magnetic field is generated by energizing the coil 28, the viscosity of the magnetic viscous fluid in the fluid passages 22a of the piston 22 increases to make it difficult for the magnetic viscous fluid to pass through the fluid passages 22a, and, therefore, the damping force of the damper 14 increases. The increase in the amount of the damping force is controlled, as desired, by the magnitude of an electric current supplied to the coil 28.

When an impulsive compression load acts on the damper 14 to decrease the capacity of the second fluid chamber 26, the free piston 24 descends to absorb the impact while reducing the capacity of the gas chamber 27. Also, when an impulsive tensile load acts on the damper 14 to increase the capacity of the second fluid chamber 26, the free piston 24 ascends to absorb the impact while increasing the capacity of the gas chamber 27. Further, when the piston 22 descends and the capacity of the piston rod 23 housed in the cylinder 21 increases, the free piston 24 descends to absorb the increased amount of capacity.

Thus, the electronic control unit U individually controls the damping forces of each damper 14 provided on a respective wheel W based on the above-spring acceleration detected by the above-spring acceleration sensor Sb, the damper displacement detected by the damper displacement sensor Sc, the lateral acceleration detected by the lateral acceleration sensor Sd, and the longitudinal acceleration detected by the longitudinal acceleration sensor Se. Consequently, by using the electronic control unit U, riding comfort is enhanced by suppressing the swing of the vehicle when riding over an uneven spot on the road surface, driving stability is enhanced by suppressing rolling when turning the vehicle, and driving stability is enhanced by suppressing pitching during times of sudden acceleration and deceleration of the vehicle.

When a proper electric current cannot be supplied to the coil 28 of the damper 14 due to failure of the electronic control unit U, the damping force of the damper 14 becomes uncontrollable. Specifically, when energization of the coil 28 is not possible, the damping force of the damper 14 is held at an extremely small value, leading to the possibility that riding comfort and driving stability of the vehicle will greatly deteriorate. Thus, in this embodiment, when the electronic control unit U fails, a predetermined constant electric current is continuously supplied to the coil 28 from the electric current supply circuit 29 in place of the electronic control unit U which has failed.

Because the signals from the above-spring acceleration sensor Sb, the damper displacement sensor Sc, the lateral acceleration sensor Sd, and the longitudinal acceleration sensor Se are not input into the electric current supply circuit 29, the electric current supplied to the coil 28 cannot be controlled in response to the driving state of the vehicle. Rather, a constant electric current from which the damper 14 can generate an ordinary damping force is continuously supplied to the coil 28. Accordingly, a minimum acceptable level of riding comfort and driving stability is provided until operation of the electric control unit U is restored.

Figure 3:
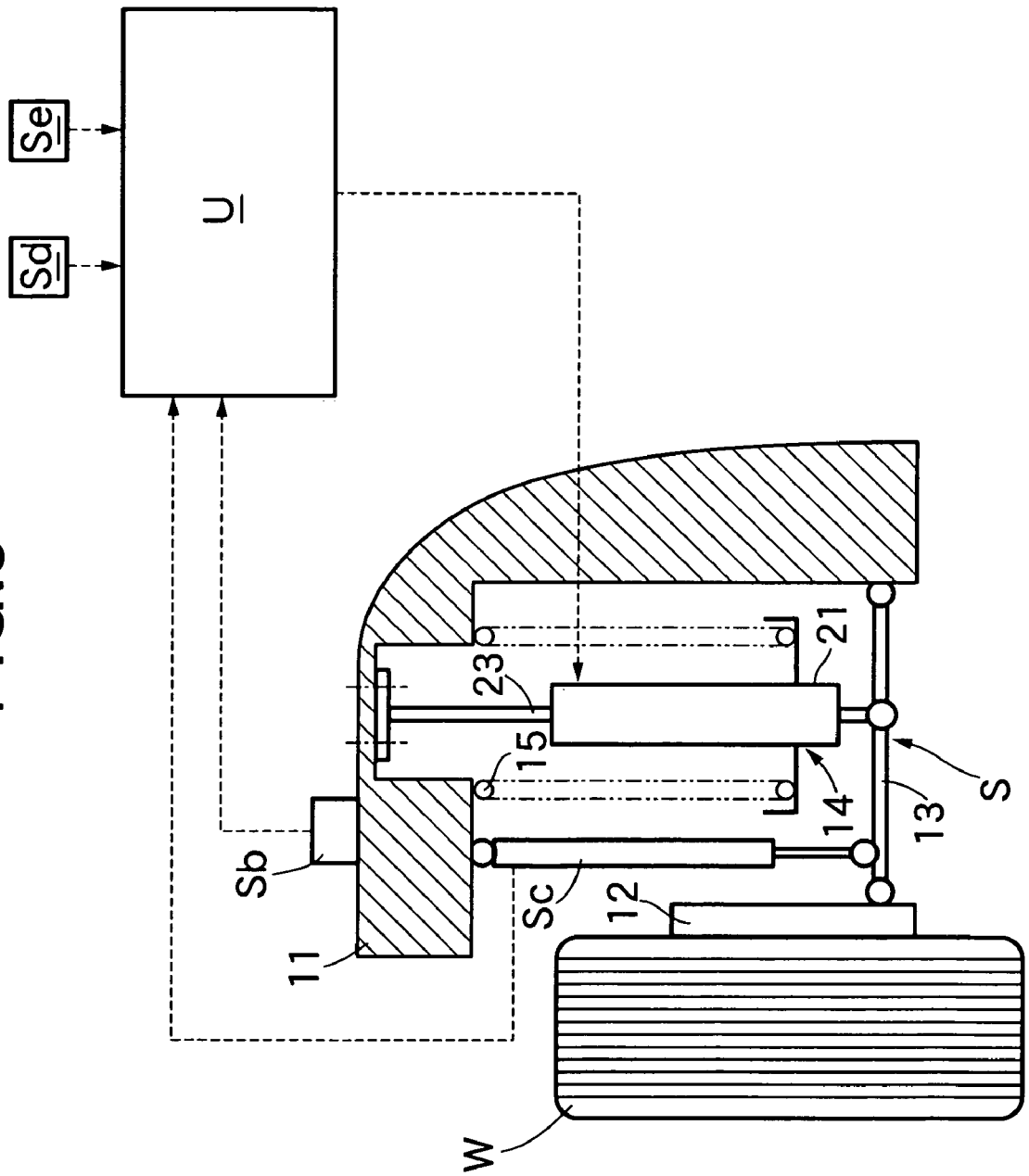
FIG. 3 is a front view of a suspension system for a vehicle, including a damper with a variable damping force according to a second embodiment of the present invention.

A second embodiment of the present invention will now be described based on FIG. 3.

The first embodiment includes the electric current supply circuit 29 to backup the electronic control unit U. However, the second embodiment of the present invention does not include the electric current supply circuit 29. Instead, the electronic control unit U of the second embodiment has an abnormality determining function, which, upon determining that an abnormality is occurring, stops energization control of the coil 28 in response to the driving state of the vehicle. Energization control is stopped when the output of the above-spring acceleration sensor Sb, the damper displacement sensor Sc, the lateral acceleration sensor Sd, or the longitudinal acceleration sensor Se indicates an abnormal value which cannot be provided in a normal state, or when the target electric current of the coil 28, calculated from the outputs of the sensors, indicates an abnormal value which cannot be provided in a normal state. A predetermined constant electric current, that is specified in advance, is continuously supplied to the coil 28. The constant electric current is the same as that supplied from the electric current supply circuit 29 in the first embodiment, wherein the damper 14 generates a predetermined damping force to secure the minimum acceptable level of riding comfort and driving stability until the cause of the abnormality is identified and addressed.

Figure 4:
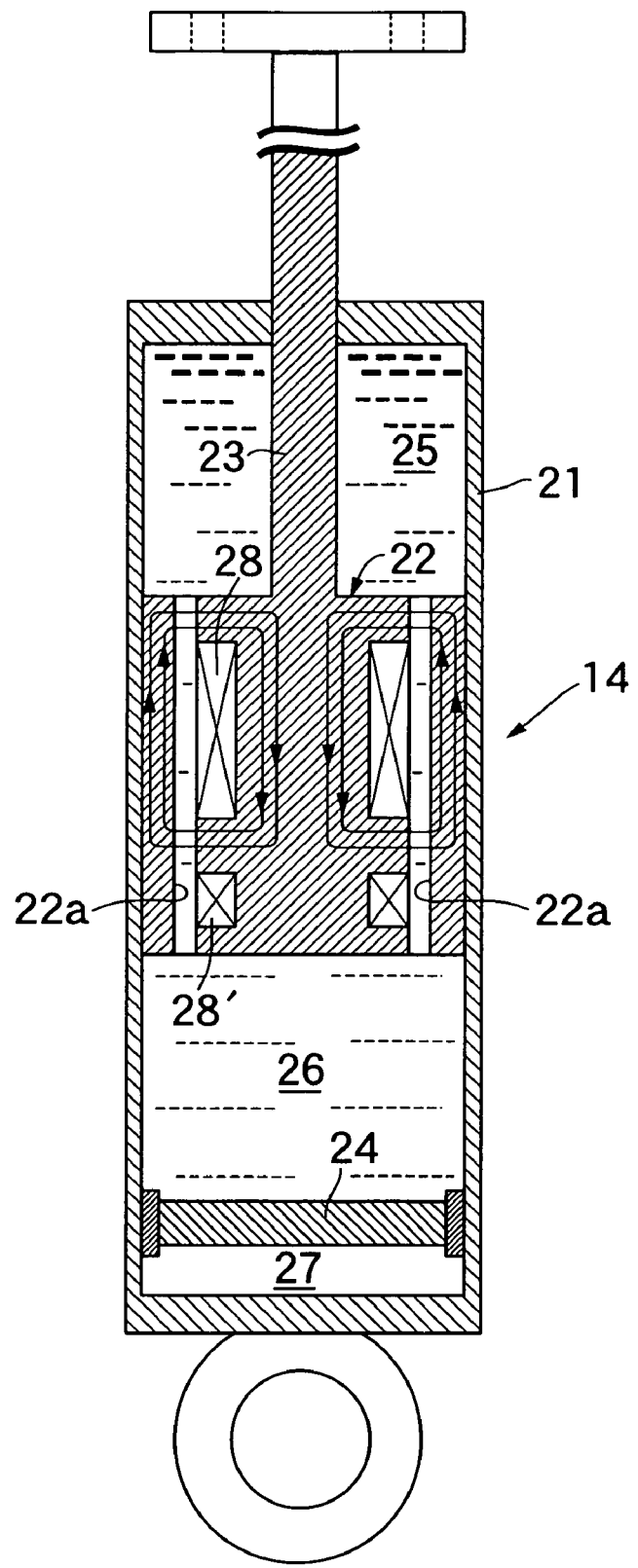
FIG. 4 is an enlarged sectional view of a damper with a variable damping force according to a third embodiment of the present invention.

A third embodiment of the present invention will now be described based on FIG. 4.

The third embodiment includes a sub-coil 28' disposed in parallel with respect to the coil 28 provided in the piston 22 of the damper 14. Accordingly, when the coil 28 is broken, control of the damping force of the damper 14 becomes impossible, the damping force of the damper 14 is held at the extremely low value, and, as such, a predetermined constant electric current is supplied to the sub-coil 28' by command from the electronic control unit U which detects the coil 28 has broken. As a result, the damper 14 generates a predetermined damping force to secure the minimum acceptable level of riding comfort and driving stability.

Although several embodiments of the present invention have been described above, it should be noted that various design changes can be made without departing from the spirit and scope of the present invention.

What is claimed is:

1. A damper with a controllable variable damping force, the damper comprising:
a piston having a piston body;
a cylinder provided with a magnetic viscous fluid and the piston therein, wherein an entire outer radial peripheral surface of the piston body relative to a longitudinal axis of the piston body slidingly engages an inner peripheral surface of the cylinder, and wherein an interior of the cylinder is divided into a first fluid chamber and a second fluid chamber by the piston;
a fluid passage that passes through the piston body and places the first fluid chamber in communication with the second fluid chamber;
a coil provided in the piston body and which is energized for operation of the damper by an electric current supplied by a controller, wherein a viscosity of the magnetic viscous fluid in the fluid passage is changed by the coil being energized by the controller;
an electric current supply circuit which supplies a predetermined constant electric current to the coil when the electric current supplied by the controller fails to be supplied to the coil; and
a sub-coil provided in the piston body, wherein the sub-coil is disposed in parallel relative to the coil, and wherein the controller supplies a predetermined constant electric current to the sub-coil whenever the coil is not operating properly with the electric current supplied by the controller, wherein a magnetic flux generated by the sub-coil influences the slide movement of the piston in the cylinder in opposite directions in place of said coil.

2. The damper according to claim 1, wherein a free piston is disposed within the second fluid chamber to define a gas chamber within the cylinder.

3. The damper according to claim 2, wherein the free piston is disposed between the second fluid chamber and the gas chamber.

4. The damper according to claim 1, wherein the damper is disposed between a vehicle body and suspension system which suspends a wheel of a vehicle.

5. A damper for damping a movement of a structure with a controllable variable damping force, the damper comprising:
a piston having a piston body;
a cylinder provided with a magnetic viscous fluid and the piston therein, wherein an entire outer radial peripheral surface of the piston body relative to a longitudinal axis of the piston body slidingly engages an inner peripheral surface of the cylinder, and wherein an interior of the cylinder is divided into a first fluid chamber and a second fluid chamber by the piston;
a fluid passage that passes through the piston body and places the first fluid chamber in communication with the second fluid chamber;
a coil provided in the piston body and which is energized by an electric current supplied by a controller, an amplitude of the electric current being changeable in response to the movement of the structure, wherein a viscosity of the magnetic viscous fluid in the fluid passage is changed by the coil being energized by the controller,
wherein a predetermined constant electric current is supplied to the coil by the controller when the electric current of the changeable amplitude fails to energize the coil; and
a sub-coil provided in the piston body, wherein the sub-coil is disposed in parallel relative to the coil, and wherein the controller supplies a predetermined constant electric current to the sub-coil whenever the coil is not operating properly with the electric current supplied by the controller, wherein a magnetic flux generated by the sub-coil influences the slide movement of the piston in the cylinder in opposite directions in place of said coil.

6. The damper according to claim 5, wherein a free piston is disposed within the second fluid chamber to define a gas chamber within the cylinder.

7. The damper according to claim 6, wherein the free piston is disposed between the second fluid chamber and the gas chamber.

8. The damper according to claim 5, wherein the damper is disposed between a vehicle body and suspension system which suspends a wheel of a vehicle.

9. A damper with a controllable variable damping force, the damper comprising:
a piston having a piston body; a cylinder provided with a magnetic viscous fluid and the piston therein, wherein an entire outer radial peripheral surface of the piston body relative to a longitudinal axis of the piston body slidingly engages an inner peripheral surface of the cylinder, and wherein an interior of the cylinder is divided into a first fluid chamber and a second fluid chamber by the piston;
a fluid passage that passes through the piston body and places the first fluid chamber in communication with the second fluid chamber;
a coil provided in the piston body and which is energized for operation of the damper by an electric current supplied by a controller, wherein a viscosity of the magnetic viscous fluid in the fluid passage is changed by the coil being energized by the controller; and a sub-coil provided in the piston body, wherein the sub-coil is disposed in parallel relative to the coil, and wherein the controller supplies a predetermined constant electric current to the sub-coil whenever the coil is not operating properly with the electric current supplied by the controller, wherein a magnetic flux generated by the sub-coil influences the slide movement of the piston in the cylinder in opposite directions in place of said coil.

10. The damper according to claim 8, wherein a free piston is disposed within the second fluid chamber to define a gas chamber within the cylinder.

11. The damper according to claim 10, wherein the free piston is disposed between the second fluid chamber and the gas chamber.

12. The damper according to claim 10, wherein the damper is disposed between a vehicle body and suspension system which suspends a wheel of a vehicle.

13. The damper according to claim 10, wherein the sub-coil is disposed between the coil and the second fluid chamber.

14. The damper according to claim 1, wherein the fluid passage abuts the coil and is parallel relative to a longitudinal axis of the piston.

15. The damper according to claim 5, wherein the fluid passage abuts the coil and is parallel relative to a longitudinal axis of the piston.

16. The damper according to claim 9, wherein the fluid passage abuts the coil and sub-coil and is parallel relative to a longitudinal axis of the piston.

* * * * *